P. H. SMITH.
BURNER.
APPLICATION FILED SEPT. 26, 1910.

998,130.

Patented July 18, 1911.

Witnesses
Benjamin Finckel
Mayme Foard

Inventor
Paul H. Smith
by Finckel & Finckel
his Attorneys

UNITED STATES PATENT OFFICE.

PAUL H. SMITH, OF COLUMBUS, OHIO.

BURNER.

998,130.   Specification of Letters Patent.   Patented July 18, 1911.

Application filed September 26, 1910. Serial No. 583,716.

*To all whom it may concern:*

Be it known that I, PAUL H. SMITH, a citizen of the United States, residing at Columbus, in the county of Franklin and State of Ohio, have invented a certain new and useful Improvement in Burners, of which the following is a specification.

The object of this invention is to provide an improved simplified and compact burner in which the globe can be raised or depressed so as to inclose or expose the flame or other illuminant.

The invention consists in the combination of parts substantially as herein shown and described and then pointed out in the claims.

Figure 2:
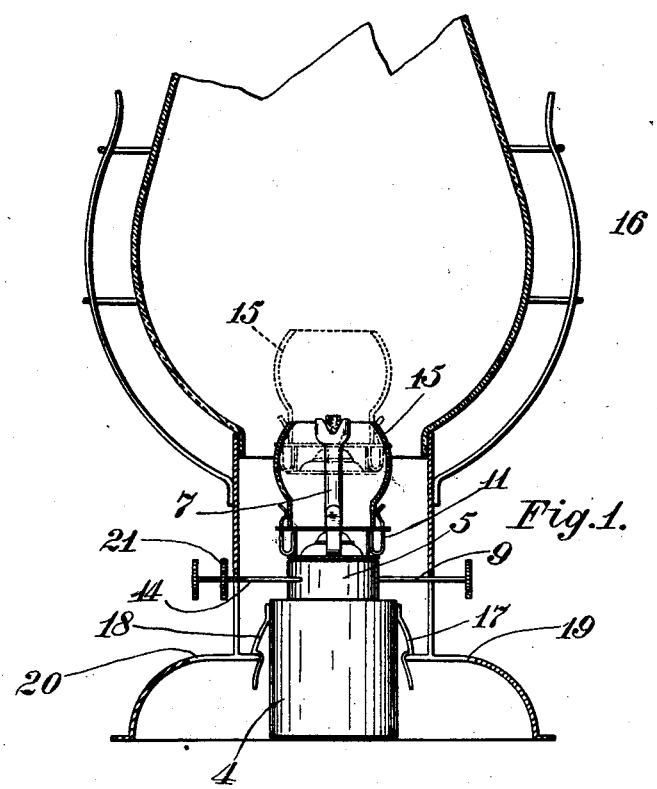
Figure 3:
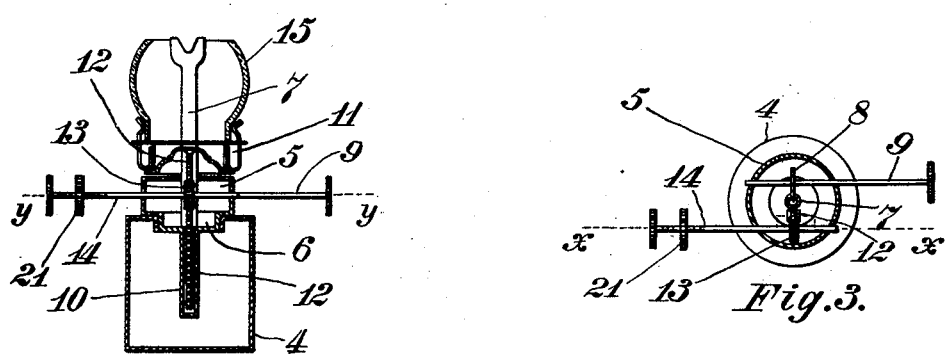

In the accompanying drawing—Figure 1 is a view in elevation of the burner with parts in section showing the same applied to a lantern. Fig. 2 is a vertical sectional view on the line $x$—$x$ Fig. 3 and Fig. 3 is a horizontal sectional view on the line $y$—$y$ Fig. 2.

In the views 4 designates the oil cup or reservoir. The burner proper comprises a chamber 5 having a depressed portion 6 that threads into a threaded opening in the top of the oil cup; a wick tube 7 that is secured in the depressed portion 6 and a spur wheel 8 operated by a shaft 9 to raise and lower the wick. Extending from the bottom of the depressed portion 6 down into the oil cup is a tube or well 10 that is open at its upper end only so that no oil can get into it from the cup.

11 designates a globe holding frame from the lower portion of which extends a rack 12. The rack 12 extends through a hole adjacent the wick tube in the upper wall of the chamber 5 into the tube 10 and in the chamber 5 is a pinion 13 having fixed therein a shaft 14 for turning the same so as to operate the rack in order that the globe holding frame may be raised or lowered.

15 designates the globe which can be of colored glass, if desired.

16 designates an ordinary lantern.

The burner described can be connected with the lantern by any suitable means those shown consisting of spring catches 17 and 18 secured on opposite sides of oil cup. To permit the burner with its wick and globe operating shafts to be inserted upward into the lantern the base of the lantern is provided with openings at 19 and 20 of proper form to permit the passage of said members. The shaft 14 is provided with a clamp nut 21 to pinch against the base of the lantern or other part to hold the globe raised where friction alone would not suffice. When this burner is used in connection with a lantern the globe of the lantern can be of clear or white glass and the globe of the burner of red or other colored glass so that the color of the light radiated by the lantern varies from that of the illuminant itself to that of the globe of the burner.

What I claim is:

1. A burner for a lamp or lantern comprising, in combination, a chambered member for removable connection with the oil cup of the lamp or lantern, said chambered member having therein a wick tube with means for operating a wick in said tube, said chambered member also having passages in its upper and lower walls for a rack, a globe-holding frame provided with a rack, said rack adapted to extend through said passages in the chambered member and into the oil cup, and means for operating said rack, substantially as described.

2. A burner for a lamp or lantern comprising, in combination, a chambered member for removable connection with the oil cup of the lamp or lantern, said chambered member having therein a wick tube with means for operating a wick in said tube, said chambered member also having openings in its upper and lower walls and provided at the opening in its lower wall with a well for the reception of a rack, a globe-holding frame provided with a rack, said rack extending through the said openings in the upper and lower walls of the chambered member and into the said well, and means for operating said rack, substantially as described.

PAUL H. SMITH.

Witnesses:
BENJ. FINCKEL,
MAYME FOARD.

Copies of this patent may be obtained for five cents each, by addressing the "Commissioner of Patents, Washington, D. C."